Patented June 21, 1927.

1,633,392

UNITED STATES PATENT OFFICE.

FRIEDRICH BOEDECKER, OF BERLIN-DAHLEM, GERMANY.

SEDATIVE AND HYPNOTIC UREIDES.

No Drawing. Application filed September 9, 1926, Serial No. 134,567, and in Germany March 3, 1923.

This invention relates to the production of certain acetyl urea derivatives according to the formula

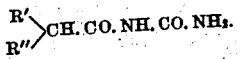

Hitherto only compounds of this kind, wherein R' and R'' were formed by equal saturated unbranched hydrocarbon radicals, were known. These compounds possess only slightly sedative properties.

Now I have found that compounds according to the formula

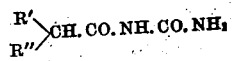

in which R' represents any saturated or non-saturated aliphatic hydrocarbon radical, whereas R'' signifies a non-saturated radical such as allyl, may not only be used as sedatives, but also as hypnotics, since relatively small quantities of them produce sleep for several hours. Especially those compounds of this type in which R' is formed by a branched carbon chain, as the isopropyl radical for instance, have been proved superior in these respects to several compounds of the barbituric acid type.

The new compounds according to my invention may be produced in any way corresponding to the principles of organic chemistry, but the best results have been obtained by the action of urea on the chlorides of the respective alkyl substituted acetic acids.

Examples.

1. 63 parts of isopropyl-allyl-acetyl chloride are well mixed with 48 parts of urea. The mixture is allowed to stand for several hours and then heated in a steam bath for 6 hours. The mixture gradually solidifies to a cake of crystals which is pulverized and well extracted with water. By recrystallizing the residue from alcoholic solution, 60 parts of the isopropyl-allyl-acetyl ureide are obtained in the form of long colorless needles showing a freezing-point of 190 to 191° C.

The reaction takes place according to the following equation:

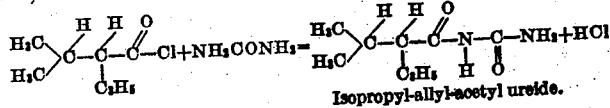
Isopropyl-allyl-acetyl ureide.

The compound is easily soluble in hot alcohol and glycerine, difficulty soluble in ether, practically insoluble in water.

2. Into a solution of 141 parts, by weight, of isopropyl-allyl-acetamide (freezing-point 107° C.) in carbon tetrachloride, 47 parts, by weight, of cyanic acid are introduced at 0° C. Hereupon the reacting mixture is heated for several hours under pressure to 100–110° C. Upon cooling-down the separated crystalline reaction product is filtered off, extracted with alcohol to remove any cyamelide possibly contained and recrystallized from alcoholic solution. The remainder of the ureide contained in the filtrate from the raw product may be obtained in pure form by distilling off the carbon tetrachloride and recrystallizing the residue from alcoholic solution. The properties of the isopropyl-allyl-acetyl ureide thus obtained correspond to those of the ureide produced according to example 1.

This reaction corresponds to the following equation:

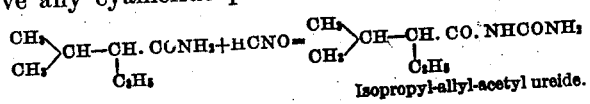
Isopropyl-allyl-acetyl ureide.

3. 7.5 parts of sodium metal are dissolved in a solution of 70 parts, by weight, of secondary butyl-malonic acid di-ethylester in 75 parts, by volume, of absolute alcohol. After addition of 47 parts, by weight, of allyl bromide the mixture is refluxed for 8 hours. Then the alcohol is distilled off, the residue dissolved in water, the solution extracted by ether, and the ethereal solution dried by means of $Na_2SO_4$. By distilling off the ether, sec. butyl-allyl-malonic ester is obtained showing a boiling-point of 145 to 148° C. at a pressure of 12 mm.

To saponify the ester obtained, 64 parts, by weight, of the sec. butyl-allyl-malonic ester are gradually added to a concentrated aqueous solution of 84 parts of caustic potash, and the mixture is kept boiling during several hours, until a sample dissolves clearly in water without separating oily matter. The reaction product, which solidifies on cooling-down, is dissolved in 100 parts of water and acidified with 60 parts of hydrochloric acid (1.19 specific gravity. The liberated acid is extracted with ether, the ether evaporated, and the remaining sec. butyl-allyl-malonic acid transformed, by heating the same to 190° C., to sec. butyl-allyl-acetic acid, showing a boiling-point of 228-230° C.

36 parts of sec. butyl-allyl-acetic acid are heated in a steam bath with 72 parts of thionyl chloride, until no more hydrochloric acid gas is developed. The reaction product is subjected to fractional distillation, whereby the sec. butyl-allyl-acetyl chloride is obtained, the output being almost theoretical. The compound thus obtained forms a colorless oil showing a boiling-point of 60° C. at a pressure of 12 mm.

40 parts of the chloride are well mixed with 30 parts, by weight, of urea and, after standing for several hours, heated in a steam bath for some hours. The mixture is gradually converted to a solid cake of crystals which is extracted with water. The residue, after recrystallization from alcoholic solution, yields the sec. butyl-allyl-acetyl ureide; it forms fine crystals having a freezing-point of 147-148° C. It is easily soluble in hot alcohol, difficultly soluble in ether and practically insoluble in water.

The several steps of this process are illustrated by the following equations:

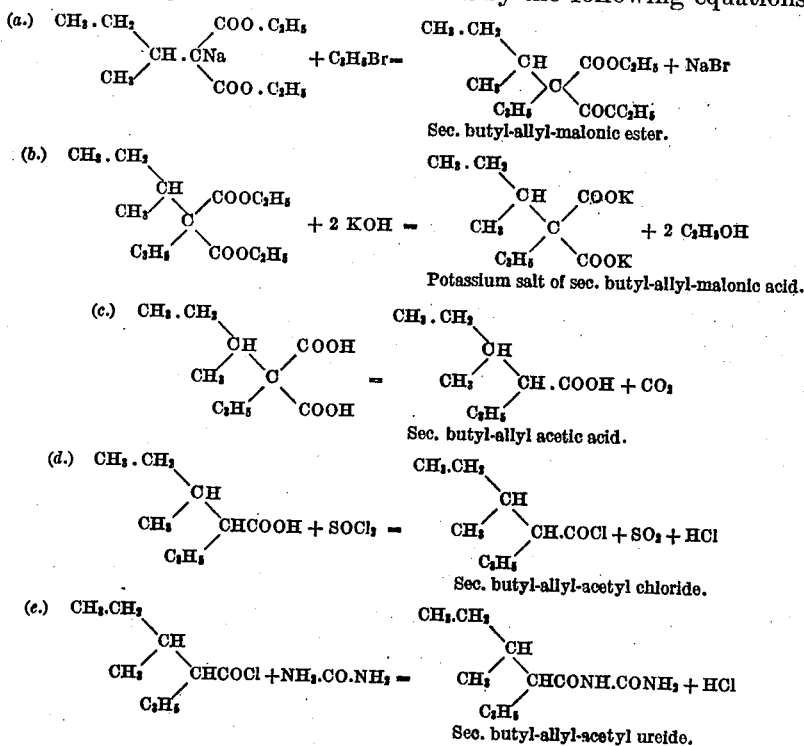

I claim:—

1. As an article of manufacture and trade, a sedative and hypnotic compound consisting of the ureide of a di-alkyl substituted acetic acid, one of the alkyl radicals at least being non-saturated.

2. As an article of manufacture and trade, a sedative and hypnotic compound consisting of the ureide of an alkyl-allyl-acetic acid.

3. As an article of manufacture and trade, a sedative and hypnotic compound consisting of the ureide of isopropyl-allyl-acetic acid.

4. The process of producing a sedative and hypnotic compound which consists in acting with urea on a di-alkyl substituted acetyl chloride, one of the alkyl radicals at least being non-saturated.

5. The process of producing a sedative and hypnotic compound which consists in acting with urea on an alkyl-allyl-acetyl chloride.

6. The process of producing a sedative and hypnotic compound which consists in acting with urea on isopropyl-allyl-acetyl chloride.

7. As an article of manufacture and trade, a sedative and hypnotic compound consisting of the ureide of a di-alkyl substituted acetic acid, one of the alkyl radicals being non-saturated and the other containing a branched carbon chain.

8. The process of producing a sedative and hypnotic compound which consists in acting with urea on a di-alkyl substituted acetyl chloride, one of the alkyl radicals being non-saturated and the other containing a branched carbon chain.

In testimony whereof I affix my signature.

FRIEDRICH BOEDECKER.